US011169905B2

(12) United States Patent
Cai et al.

(10) Patent No.: US 11,169,905 B2
(45) Date of Patent: Nov. 9, 2021

(54) TESTING AN ONLINE SYSTEM FOR SERVICE ORIENTED ARCHITECTURE (SOA) SERVICES

(71) Applicant: International Business Machines Corporation, Armonk, NY (US)

(72) Inventors: Lin Cai, Shanghai (CN); Yi Ming Yin, Shanghai (CN); Di Ling Chen, Beijing (CN); Li Wu, Shanghai (CN); Xue Gang Ding, WuXi (CN)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/174,821

(22) Filed: Oct. 30, 2018

(65) Prior Publication Data

US 2020/0133826 A1 Apr. 30, 2020

(51) Int. Cl.
*G06F 11/00* (2006.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
CPC .................................................. G06F 11/3438
See application file for complete search history.

(56) References Cited

U.S. PATENT DOCUMENTS

| 5,671,351 A | 9/1997 | Wild |
| 7,028,223 B1 | 4/2006 | Kolawa |
| 7,233,989 B2 | 6/2007 | Srivastava |
| 9,104,811 B1* | 8/2015 | Cohen ........................ G06F 8/30 |
| 9,405,665 B1* | 8/2016 | Shashi ................. G06F 16/2246 |
| 9,755,921 B2 | 9/2017 | Thirumalai |
| 9,766,769 B1* | 9/2017 | Webber ............... G06F 11/3668 |
| 2006/0048017 A1 | 3/2006 | Anerousis |
| 2009/0077422 A1* | 3/2009 | Khaladkar .......... G06F 11/3684 714/33 |
| 2011/0302454 A1 | 12/2011 | Prophete |
| 2013/0060933 A1 | 3/2013 | Tung |
| 2013/0086203 A1 | 4/2013 | Avner |
| 2017/0201427 A1 | 7/2017 | Savio |
| 2017/0242774 A1 | 8/2017 | Gopu |
| 2018/0173617 A1* | 6/2018 | Tian ....................... G06F 9/451 |

(Continued)

FOREIGN PATENT DOCUMENTS

| CN | 104298604 B | 1/2015 |
| CN | 106230638 A | 12/2016 |

OTHER PUBLICATIONS

Google Scholar/Patents—text refined (Year: 2020).*

(Continued)

*Primary Examiner* — Christopher S McCarthy
(74) *Attorney, Agent, or Firm* — Stephen R. Yoder

(57) ABSTRACT

The present invention generally relates to system test, and more specifically, related to online system test. In an aspect, a computer-implemented method for online system test is provided. In this method, a test rule for testing the online system is obtained. And a test result from a real user action of the online system based on the test rule will be retrieved. And a test report is generated at least based on the test result from the real user action.

17 Claims, 7 Drawing Sheets

(56) References Cited

U.S. PATENT DOCUMENTS

2020/0050540 A1* 2/2020 Gao .................... G06F 11/3692
2020/0142816 A1* 5/2020 R ........................ G06F 11/3438

OTHER PUBLICATIONS

Google Scholar/Patents—text refined (Year: 2021).*
Lo et al., "An Architecture for Cloud Service Testing and Real Time Management", 2015 IEEE 39th Annual International Computers, Software & Applications Conference, DOI 10.1109/COMPSAC. 2015.271, pp. 598-603.
Mell et al., "The NIST Definition of Cloud Computing", National Institute of Standards and Technology, U.S. Department of Commerce, Special Publication 800-145, Sep. 2011, 7 pages.
Mohammad et al., "Cloud Services Testing: An Understanding", The 2nd International Conference on Ambient Systems, Networks and Technologies (ANT), Elsevier, Procedia Computer Science 5 (2011) 513-520, Available online at www.sciencedirect.com, 8 pages.
Wang et al., "Self-adaptive cloud monitoring with online anomaly detection", Future Generation Computer Systems 80 (2018) 89-101, Elsevier, Science Direct, journal homepage: www.elsevier.com/locate/fgcs, <https://doi.org/10.1016/j.future.2017.09.067>, © 2017 Published by Elsevier B.V.

* cited by examiner

TESTING AN ONLINE SYSTEM FOR SERVICE ORIENTED ARCHITECTURE (SOA) SERVICES

BACKGROUND

The present invention generally relates to online systems testing.

Service oriented architecture computing services (herein sometimes referred to more simply as "services") are known. In the contexts of software architecture, service-orientation in computing and service-oriented software architecture, a service is a computing functionality (for example, a software functionality) or a set of computing functionalities. In common computing parlance, "service" also refers to the machine logic (for example, computer program code that provides the functionality(ies)—however, this document may sometimes refer to the machine logic that implements the functionality of a service as service code. For example, one example service is retrieval of specified information. Another example service is the execution of a set of operations. Typically, different clients reuse a given service in the context of many and various larger computing tasks. For example, a service that retrieves a record associated with a person's name from a large data base may be used in: (i) by a larger program that is used to authenticate the person's identity over a communication network; (ii) by a larger program used to implement a legal change to the person's name; and (iii) by a search engine. In this example, the same code to retrieve the individual's record does not have to be rewritten for all three programs. SOA type services that are accessible online are sometimes herein referred to as "online services."

Online services, especially in a cloud environment, usually need constant testing and monitoring. It is crucial to provide promised service availability and reliability to customers. For some current web sites, a regular test can be performed periodically by a test server to check major functions. If any problem is found, the test server will send alerts to administrators of the web sites. Then, the administrators can find out root causes of the problem and make sure the problem can be resolved within a relatively short time period. The total time consumption from identifying the problem to fixing it is a key factor when measuring qualities of online services provided by the web sites.

A "software agent," as that term is used herein is a computer program that performs requested actions for a human user of the computer program. Software agents are sometimes referred to as a "bot" (which is short for robot). Software agents are typically autonomous or coordinate their actions with other software agents and/or human users of the computer program. In some cases, software agents that interact with human users (such as: bots used in a chatroom that communicate with humans or other human-robot interaction environments) sometimes express humanistic qualities such as understanding written and spoken natural language, personality and/or embody a humanoid form.

An "online system," as that term is used herein is any set of computer components connected in data communication such that they can provide online services. If the online system is implemented in the context of a cloud environment, then it is sometimes herein referred to as a "cloud online system."

SUMMARY

Example embodiments of the present disclosure provide a method, a system, and a computer program product for online system test.

In an aspect, a computer-implemented method for testing online system is provided. In this method, a test rule for testing the online system is obtained. And a test result from a real user action of the online system based on the test rule will be retrieved. And a test report is generated at least based on the test result from the real user action.

Other embodiments and aspects, including but not limited to, computer systems and computer program products, are described in detail herein and are considered a part of the claimed invention.

According to an aspect of the present invention, there is a method, computer program product, and/or computer system that performs the following operations (not necessarily in the following order): (i) obtaining a test rule for testing the online system; (ii) retrieving one or more test results from one or more real user actions of the online system based on the test rule; (iii) generating a test report based, at least in part, upon the one or more test results received from the one or more real user actions; and (iv) using the test report to diagnose the status of the online system.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
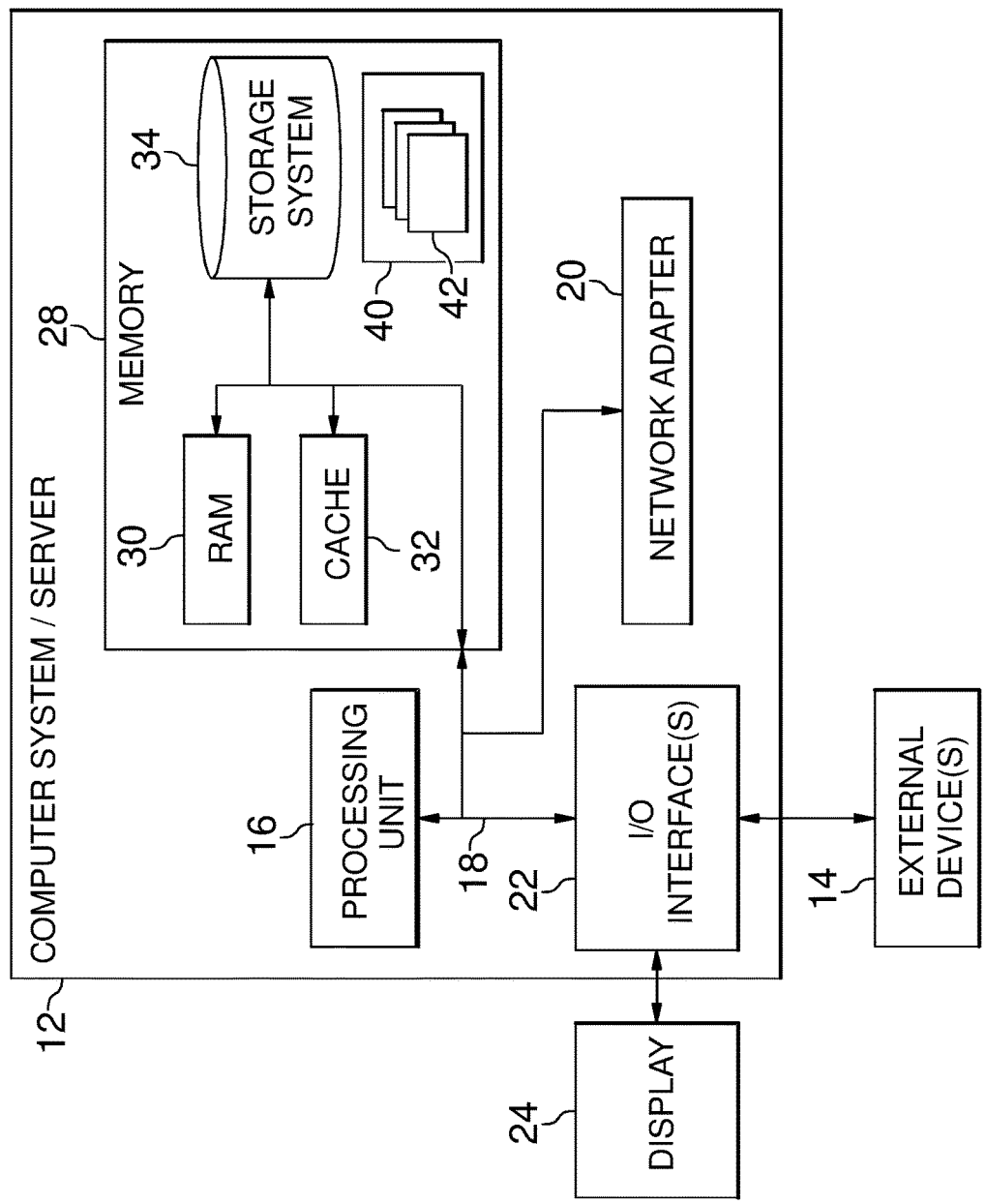
FIG. 1 depicts a cloud computing node used in a first embodiment of a system according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
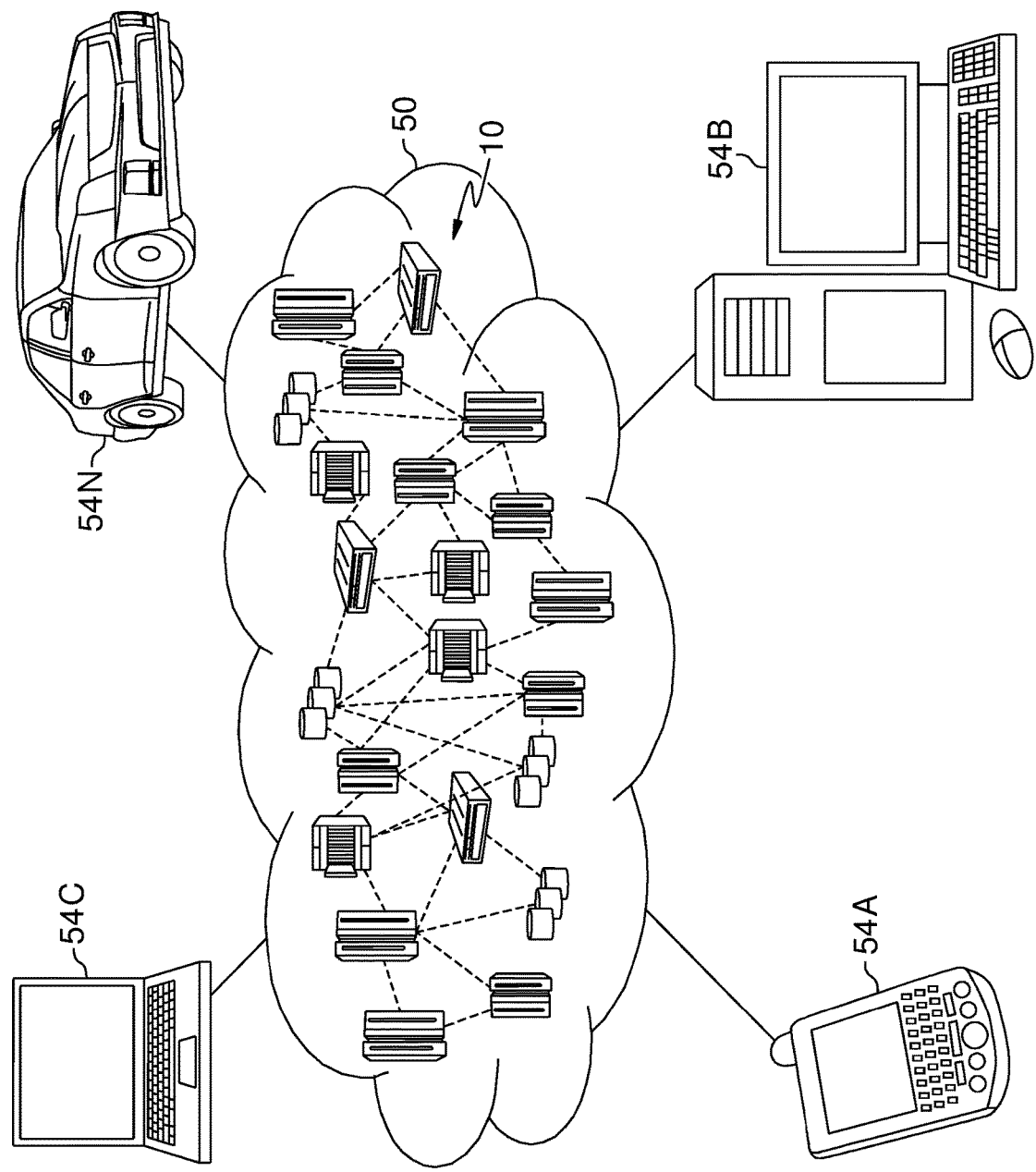
FIG. 2 depicts an embodiment of a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (for example, using a web browser).

Figure 3:
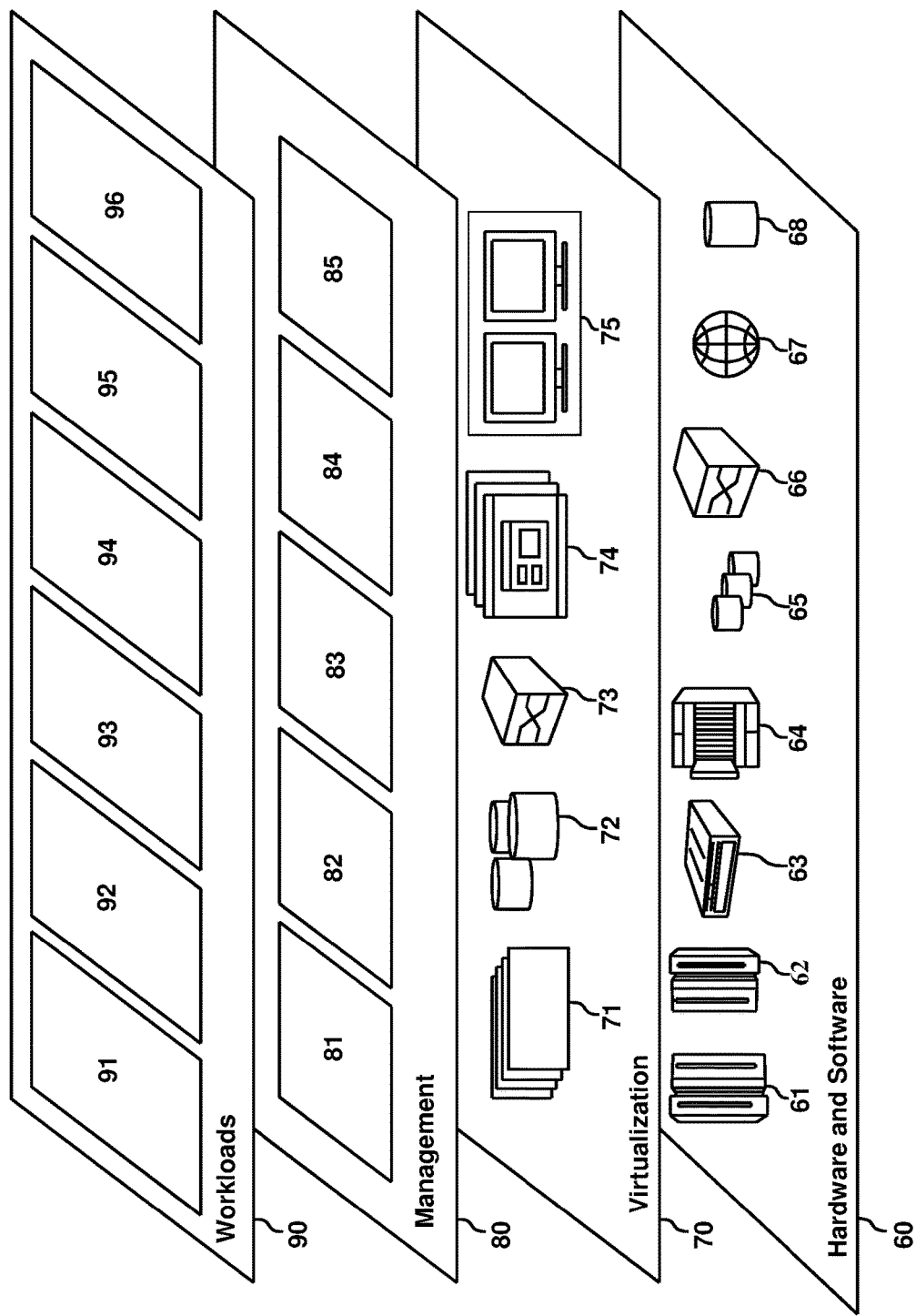
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and online system testing 96.

Current testing or monitor servers are designed to run self-maintained test cases in a predefined interval. Without taking real users' actions into consideration, they are introducing additional overhead through these test cases by verifying duplicated results and decreasing the bandwidth for real users. Such test servers also cannot differentiate issues from real user actions or that from separately designed test cases, which delays response time for engineer to determine the actual failure causes.

There are some existing solutions to partially resolve this issue via collecting the application data (such as system logs, system events, CPU, and memory consumption and so on) offline to determine the health of the system without running test cases or reducing running test cases on the online system. Such solutions, however, are not so efficient to detect issues in the time when there are large number of users with huge data generated. Since such data are collected and analyzed after they are created, test server needs to make a thorough search inch-by-inch for huge number of data which are even unstructured or unindexed, and the test server also needs to find relationships between different data, apply a series of complex models for making final heath check on the online system. With explosion of data set, it would be very difficult to make real time analysis on the data collected to generate a meaningful test report in a timely manner. With increase of computation time as well as computational complexity, the test server itself may be done or dysfunctional. As a result, the test server is not able to monitor the status of the online system.

According to embodiments of the invention, a method, system or computer program product is provided for testing an online system, where real user actions are used to achieve the testing which can reduce the overhead brought by specifically designed test cases. With real user actions involved, fewer, or even none, test cases are required to be run, thereby finding system bugs more quickly and reducing system outage time. Moreover, with a pre-defined test rule adopted, test results can be retrieved with a purpose, so that computation time and computational complexity can be reduced as well.

Now with reference to FIGS. 4 to 7, embodiments of the invention are illustrated in further detail.

Figure 4:
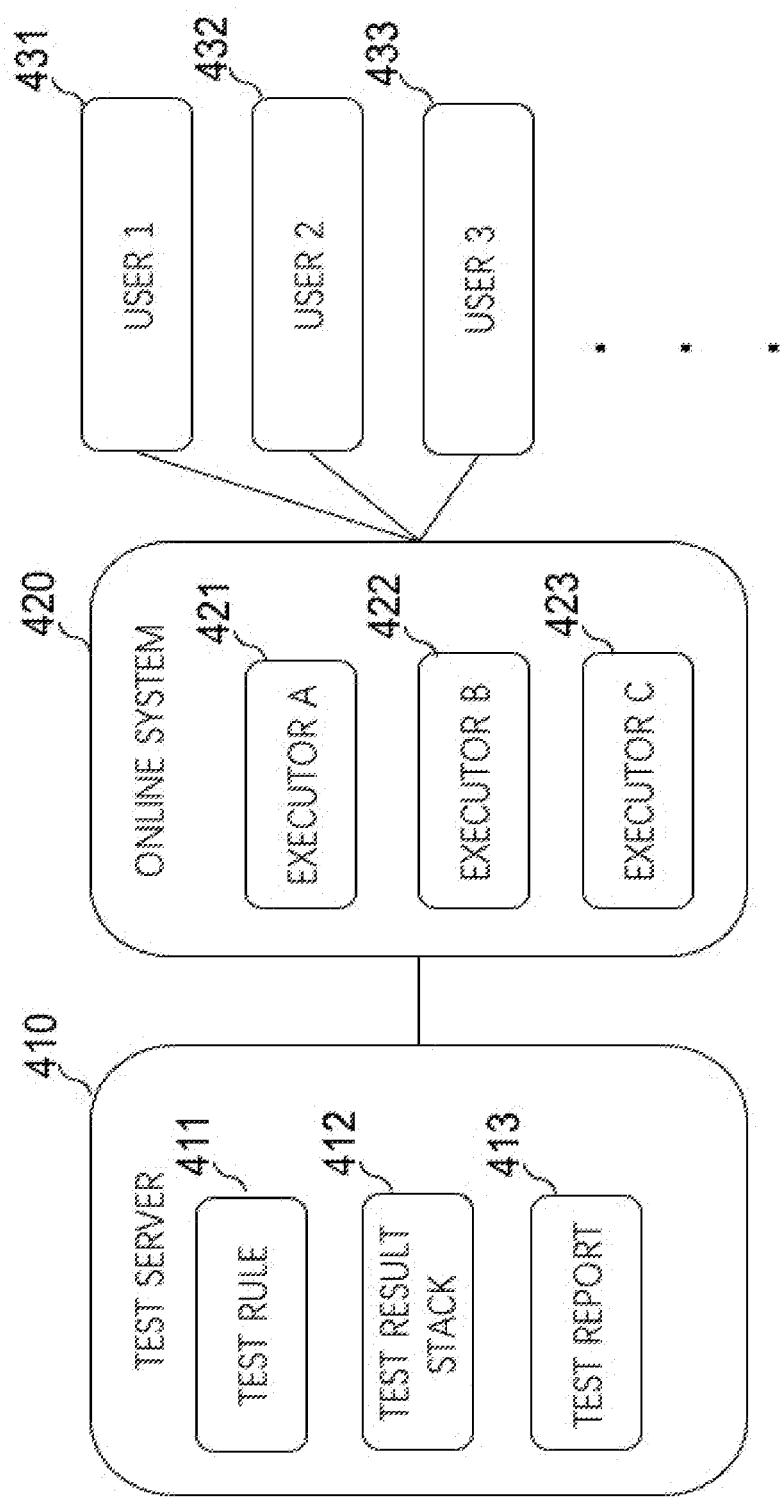
FIG. 4 illustrates an example diagram block of a system including an online system, a test server and users in accordance with an embodiment of the present invention.

FIG. 4 illustrates an example diagram block of a system including a test server 410, an online system 420, and users 431, 432, 433 in accordance with an embodiment of the present invention. The online system 420 is used to provide an online service (for example, a cloud service) to multiple users via a network (for example, Internet, etc.). The online system 420 could be connected with the test server 410. The online system 420 and the test server 410 can be located in same or different computing units. The test server 410 can be any software module or hardware controls tests of the online system, which can include various kinds of tests to check statuses of the online system, for example, how many users successfully log on the online system 420 within a predefined period, how many requests are successfully received by a specific function of the online system 420, and so on.

Test rule 411 obtained and stored in the test server 410 decides how to perform the test on the online system 420 (more information about the test rule 411 will be further illustrated in detail hereafter). Different executors 421-423 in the online system 420 can be used to perform different test functions based on directions from the test rule 411 to timely collect test results from real user actions and return it back to test result stack 412 in the test sever 410. As the term is used in this document, "real user actions" refer to actions made by an actual end user (in other words, a human being), and not a computer software agent or a test user.

As the term is used herein, "executors" means software agents that execute tests. Optionally, one or more executors in the online system 420 can also perform a standalone test case to collect test results retrieved from the standalone test case, which can simulate real user actions in some circumstance, such as lack of enough test results retrieved from the real user actions. Executors which can function to collect test results retrieved from the test case can be the same or different from executors which could function to collect test results from the real user actions. Test report 413, which could include further analysis made based on test results collected (such as statistics information about how many requests for calling a specific function being successfully performed), can be further generated for administrators to diagnose statuses of the online system 420.

TABLE 1

Three Test Rules

| Executor Name | Test Function | Timestamp | Threshold |
|---|---|---|---|
| Executor A | Function X | 30 mins | 1 |
| Executor B | Function Y | 5 mins | 5 |
| Executor C | Function Z | 10 mins | 10 |

With reference to Table 1 above, detailed illustration of the test rule table 411 can be provided. It is noted that test rule table 411 actually includes three separate test rules, but, for the sake of simplicity, this collection of rules in table 411 (that is, Table 1, above) may sometimes herein be referred to, more simply, as test rule 411. The test rule 411 can indicate which executor could be used (for example Executor's name or ID, etc.) to test what function of the online system (for example Test Function, etc.), and optionally the test rule 411 can also document a timestamp and a threshold applied to the executor. The timestamp is used to indicate an interval for the executor to collect test results from real user actions. Hot functions which are frequently accessed by the users (for example, "log on" function) will be set with a shorter timestamp, as enough test results can be easily collected within a short period of time. Cold functions which are not frequently accessed by the users will be set with a longer timestamp, as longer interval is required to be used to collect enough test results. Of course, for different functions, different criteria could be applied to determine whether there are enough test results collected depends on detail requirements for implementing such tests. For example, for function X in table 1, 1 test result collected from the real user actions within 30 mins is enough, while for function Y in table 1, 5 test results collected from the real user actions within 5 mins is enough.

As the term is used herein, a "test rule" includes: (i) identifying information for a customer environment user (see Definition of "user" below—an example of identities of customer environment users for three test rules is set forth, above, in the first column of Table 1); and (ii) a set of parameter value(s) related to generating and/or collecting diagnostic data based upon interactions between the customer environment user and the online system (sometimes herein referred to as "test results").

Parameter types corresponding to the parameter value(s) may include one, or more, of the following parameter types: (i) functionality type (see second column of Table 1, above); (ii) timer type relating to time limits and/or scheduling specification to collection of test results; (iii) online system component settings type (for example, is overclocking to be set to on or off when the test results are collected under the test rule); (iv) online components identification type (for example, which data center is to be used when collecting test results under the test rule); (v) test suite; (vi) test set name; and (vii) functionality dependency information.

In operation, when a real world customer of the SOA services of the online system is using the services, then test results are collected under the test rule corresponding to that customer. For example, if Executor B (see Table 1, above) is requesting services, then the test rule in the second row of Table 1 is invoked such that test results relating to function Y are collected under the timing actions or constraints imposed by the parameter values in the third and fourth fields of the second row of Table 1. In this example, Executor B's interactions with the online system are "actions of a real world user" because Executor B is an actual customer/end user of the SOA services, as opposed to being a systems administrator, an IT person, or an intelligent software agent performing synthetic testing. To put it a different way, the "actions of a real user," as that term is used herein, relates to production environment context use, by humans using the environment as it was designed to be used in practice. Simply put, "actions of a real user" refers to actions made by a human being, and not a pre-defined test system that repeatedly runs over the same steps according to a schedule. One significant difference between "actions of a real user" and other types of actions is the randomness in real user's actions. For example, when conducting an online transaction, a human being might perform some steps in a random order or perform certain steps in a manner that is counterintuitive or unexpected. In contrast to actions of a real user, actions of a computer test system are not typically considered "random" because a computer system executes pre-defined steps.

For some extreme cold functions, it is not able to collect enough test results from real user actions even the timestamp is set to be a very long interval. In such case, it does not mean those functions are useless or not necessary, instead those functions may be still important and worth test. Therefore, there is a need to schedule a dedicated executor (for example, executor C) to execute a standalone test case for collecting enough test results.

It should be noted that test rule is illustrated in Table 1 as a format of table, but the test rule may not necessarily be limited to the format of table, and other format including text, figures and so on can also be used to describe the test rule.

Optionally, a timer (for example, a countdown timer) could be maintained in the test rules, so that the test server can determine how many time left for this interval to decide whether there are enough test results collected from real user actions by a specific executor. For example, 00:05:00 in Table 2 below shows that there are 5 minutes left in this interval to decide whether there is at least 1 test result collected regarding to function X from the real user actions by executor A. Alternatively, the timer can be maintained by the executor in the online system 420, so that test rule can be kept as simple as shown in Table 1.

TABLE 2

Test Rule

| Executor Name | Test Function | Timestamp | Time Left | Threshold |
|---|---|---|---|---|
| Executor A | Function X | 30 mins | 00:05:00 | 1 |
| Executor B | Function Y | 5 mins | 00:01:00 | 5 |
| Executor C | Function Z | 10 mins | 00:07:00 | 10 |

TABLE 3

Test Result Stack

| Executor Name | Test Time | Tested User | Test Result |
|---|---|---|---|
| Executor A | 2018/7/17, 15:47:17 | User 1 | Pass |
| Executor B | 2018/7/17, 15:30:20 | User 1 | Pass |
| Executor A | 2018/7/17, 15:17:17 | User 2 | Fail |

With now reference to Table 3 above, how test results are stored in the test result stack is illustrated. The test results and contexts (including executor names, test times, tested users) herein are stored in the stack of Table 3 in accordance with a chronological order. Simple examples of test results are shown in Table 3 as "Pass" or "Fail" for illustrative purpose. It could be noted that more complex test results can be used depends on actual requirements. Those test results could be used as raw data to generate a test report with regards to one or more functions tested (as illustrated in Table 4 as below). Table 4 documents the numbers of test results which have been received, and the numbers of passed test results and failed test results. It could be noted that more analysis could be made based on raw data provided (which are not shown in this table).

TABLE 4

Test Report

| Function Name | Total Test Results received in an interval | Passed Test Results | Failed Test Results |
|---|---|---|---|
| Function X | 5 | 3 | 2 |
| Function Y | 10 | 7 | 1 |

It should be noted that the test result stack as well as the test report are illustrated in Table 3 and 4 above as a format of tables, they may not necessarily be limited to the format of tables, and other formats including text, figures and so on can also be used to describe the test result stack as well as the test report.

Figure 5:
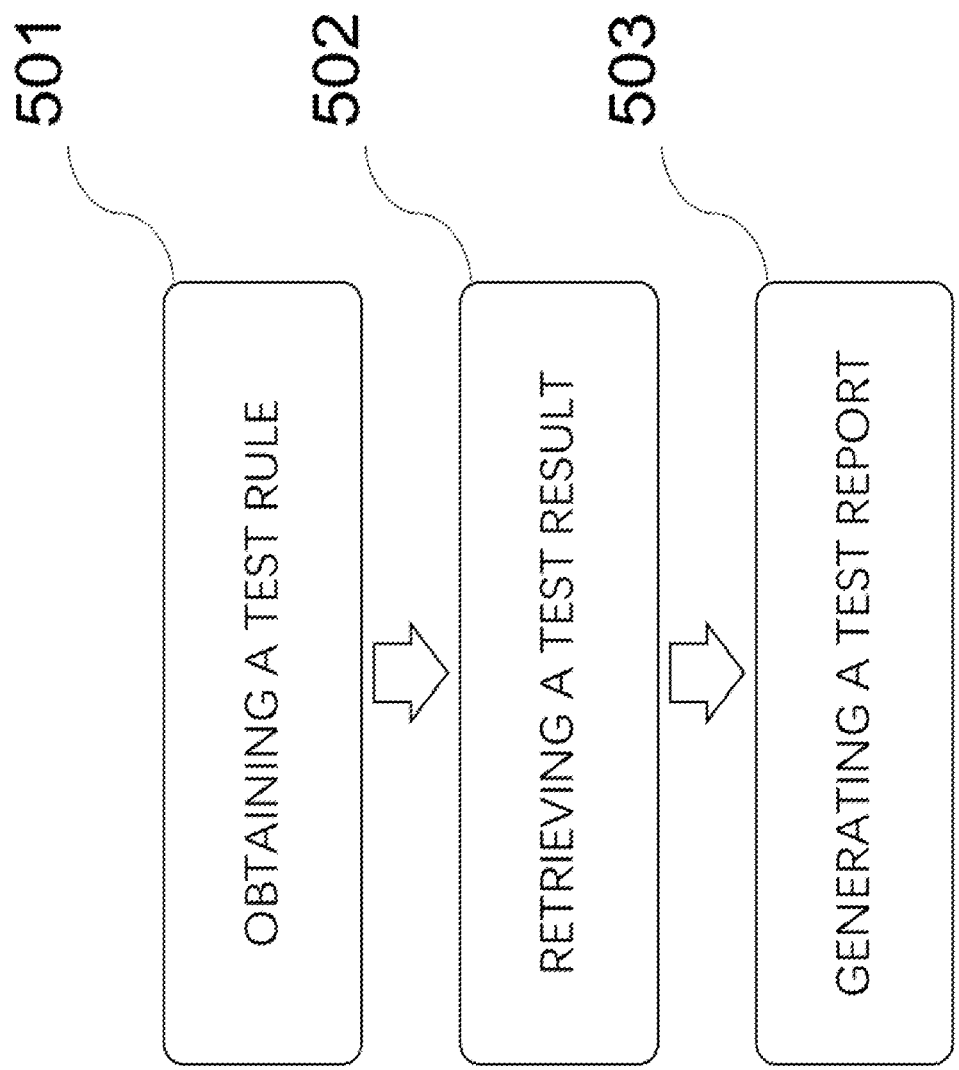
FIG. 5 illustrates an example flowchart for testing the online system in accordance with an embodiment of the present invention.

FIG. 5 illustrates an example flowchart for testing the online system in accordance with an embodiment of the present invention. According to the illustration of FIG. 5, a test rule is obtained for testing the online system at step 501. The test rule as illustrated in table 1 or 2 above can include a rule for testing the whole or at least partial functions of the online system. At step 502, one or more test results are retrieved from one or more real user actions of the online system based on the test rule. Optionally, step 502 may further comprise setting an executor in the online system for obtaining the one or more test results from the one or more real user actions based on the test rule, which can make the test process more efficient, as the executor in the online system can actively monitor the one or more test results and report back. At step 503, a test report is generated at least based on the one or more test results retrieved from the real user action.

The method illustrated in FIG. 5 can directly leverage test results from real user actions. Recourses (including CPU, memory, storage, network, bandwidth, etc.) can, therefore, be saved and overhead introduced for running the standalone test case on the online system can be reduced. Especially for hot functions, small testing intervals can be adopted, and test cost can be further reduced. In addition, a bug in the test case may cause a false alarm in the test report and using test results retrieved from real user actions reduces this kind of risk. Generally, because the test report is generated based on real data from users, overall security and reliability of the test report can be secured.

A test report may include various types of information fields including, but not limited to the following types: (i) function tested; (ii) condition(s) under which a test was run (for example, a test can be run automatically at a specified time interval, a test can be run that is responsive to a specified condition being met, and/or a test can be run based on a user request that a test be performed); (iii) number of test results received; (iv) statistical relevance of the number of test results received; (v) number of tests with a "failing" result; (vi) number of tests with a "passing" result; (vi) data center at which the test is initiated; and/or (vii) metrics to measure the service quality (such as the number of received requests to perform a test, the average response time to respond to the received requests (for example, the 0.95-quantile of the response time).

Additionally, different from conventional approaches of performing analysis on log data, the method illustrated in FIG. 5 retrieves test results based on the predefined test rule. In this way, all the test results are collected with a dedicated purpose (for example test whether function A of the online system can be successfully accessed), which can substantially increase test efficiency. Especially with the explosion of original user data typically experienced in newer computer systems, the above method is typically faster than making analysis on a huge number of log data after the system has been running for a long time, as it can find target result in a faster way.

Figure 6:
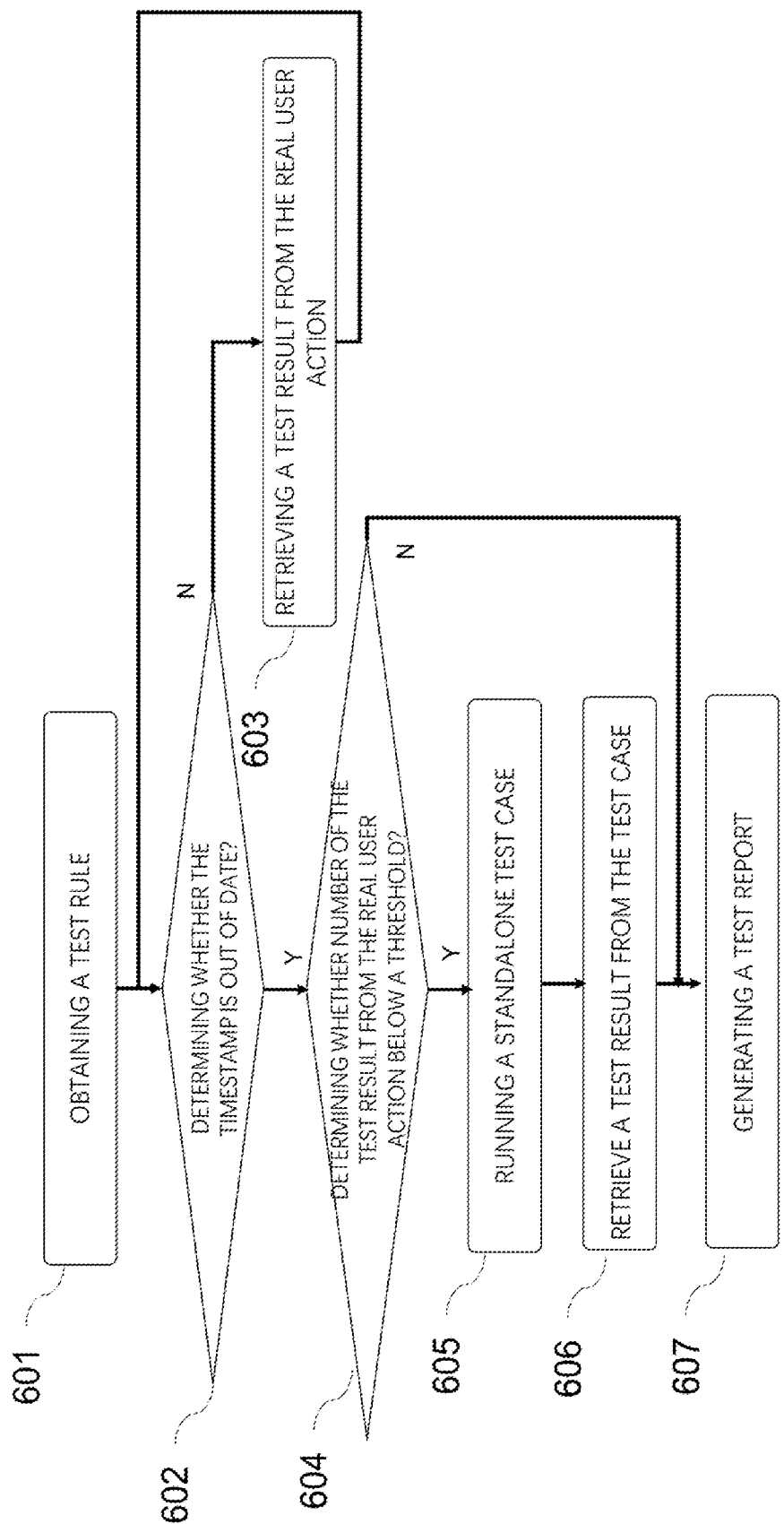
FIG. 6 illustrates another example flow chart of testing the online system in accordance with another embodiment of the present invention.

FIG. 6 illustrates another example flowchart for testing the online system in accordance with another embodiment of the present invention where the test rule includes a timestamp, which can be used as an interval for deciding whether there are enough test results collected from the real user actions. At step 601, a test rule is obtained for testing the online system.

At step 602, it is determined whether the timestamp is expired. In case the timestamp is not expired, retrieving one or more test results from one or more real user actions will be continued at step 603. Otherwise, once it is determined that the timestamp is expired, it will be further determined whether number of test results retrieved from the one or more real user actions is below a threshold at step 604. For example, when the threshold equals 1, it means within the timestamp (for example, 5 minutes) at least 1 test result needs to be retrieved from the real user action. If no test result retrieved from the one or more real user actions, the process will move forward to step 605, where a standalone test case associated with the test rule could be run on the online system.

It should be noted that the test case should not be any test case chosen at random, but, rather the test case should be a test case designed only to test a function that is same or similar to the function defined in the test rule. The test case could be manually designed by a programmer or automatically generated, the detail of which will be further illustrated below.

In case the number of the test results retrieved from the real user action is determined to be equal to or above the threshold at step 604, the process will be further moved to step 607, where a test report is generated based on the test results retrieved from the real user actions only.

After step 605, at step 606, a test result will be retrieved from the test case. At step 607, a test report is generated based on the test results retrieved from both the test case and the one or more real user actions (if any), which means the test report is generated at least based on the test results retrieved from the test case, and in case there are test results from the real user actions, the test report can be generated based on both the test results from the real user actions and the test case. Optionally, in case there are test results retrieved from both the test case and the one or more real user actions, different weights can be applied for different types of test results. More specifically, a weight of a test result retrieved from the one or more real user actions is higher than that of a test result retrieved from the test case. This is because in some cases, test results retrieved from real user actions could be more reliable than test results retrieved from the test cases, which could include a bug.

Optionally the threshold can be generated automatically based on previous real user actions. For example, during the past month, there are 300 test results received each day from real user actions on average for testing a function of the online system, and the timestamp is 1 day, therefore, the threshold could be set as 300. That is, a test case will be generated once there are less than 300 test results retrieved from real user actions within a day.

Optionally, different timestamps can be applied for different kinds of real user actions. For some key functions of the online system (for example, "log on" function), shorter intervals should be adopted to retrieve test results from real user actions to ensure there are enough test results monitored during this interval and ensure those key functions can be run correctly without any outage. For some other functions less key, longer intervals could be adopted to reduce test cost.

Figure 7:
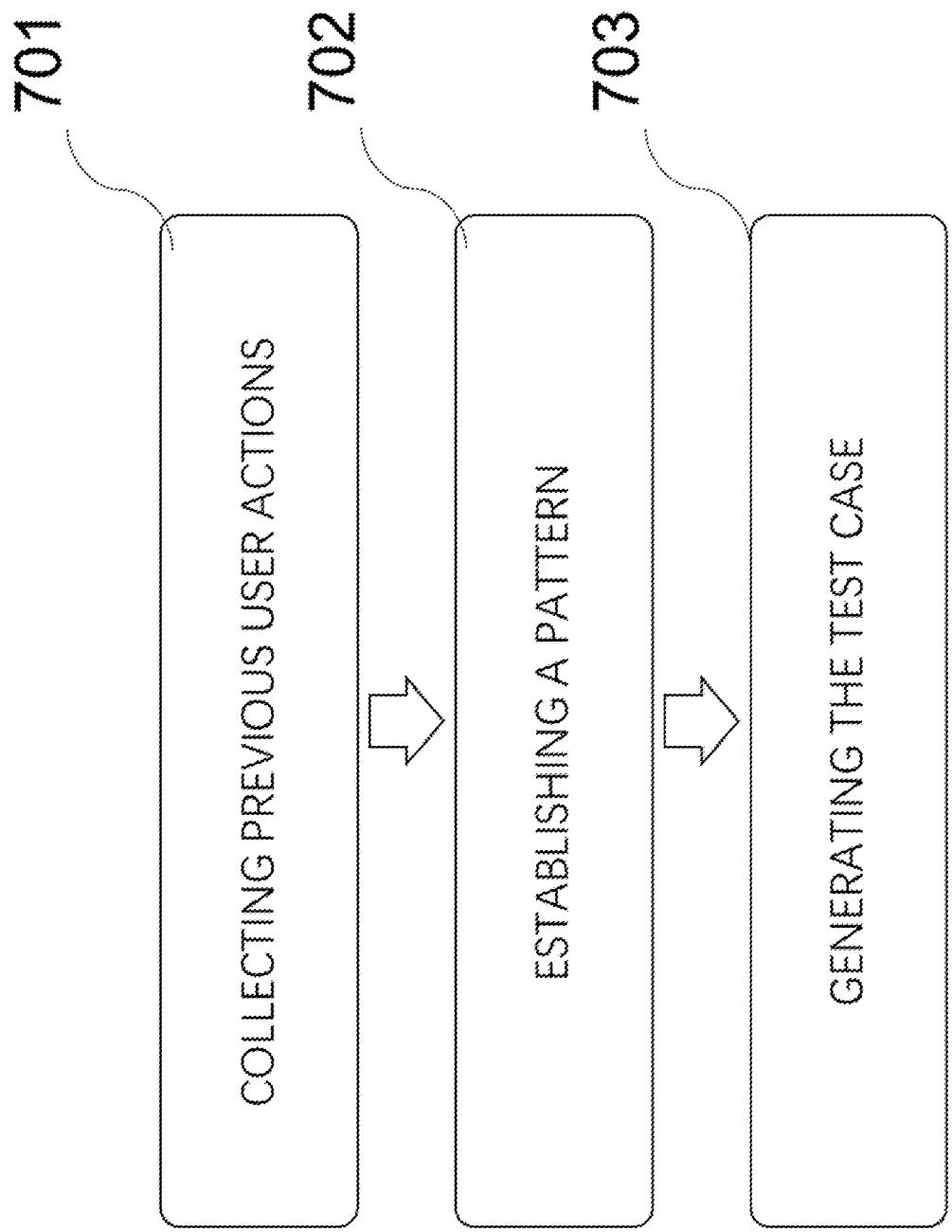
FIG. 7 illustrates an example flowchart for generating a test case in accordance with an embodiment of the present invention.

With now reference to FIG. 7, a flowchart for generating a test case automatically based on previous real user actions is illustrated. At step 701, real user actions regarding to the online system are collected. For example, real user actions regarding to function Y during a past period can be monitored and obtained from multiple users of the online system. At step 702, a pattern is established based on the previous real user actions, wherein the pattern indicates the real user actions and a context thereof. The context optionally includes at least one of following: sequence of at least two of the previous real user actions, and frequency of at least one of the previous real user actions. For example, Table 5 below illustrates the information collected at step 701. And Table 6 below illustrates the pattern established based on information collected at step 701.

TABLE 5

| Real User Action ID | Real User Action Content | User | Frequency | Last Real User Action ID | Next Real User Action ID |
|---|---|---|---|---|---|
| 17001 | Accessing Function Y | User 1 | 3 times/day | Accessing Function X | Accessing Function Z |
| 17002 | Accessing Function Y | User 2 | 4 times/day | NA | NA |

TABLE 5-continued

| Real User Action ID | Real User Action Content | User | Frequency | Last Real User Action ID | Next Real User Action ID |
|---|---|---|---|---|---|
| 17001 | Accessing Function Y | User 3 | 10 times/day | Accessing Function X | Accessing Function Z |

TABLE 6

Pattern

| Pattern ID | Content of the pattern | Frequency |
|---|---|---|
| 1 | Accessing Function X, and then Function Y and then Function Z respectively | 13 times/day |
| 2 | Accessing Function Y standalone | 4 times/day |

It should be noted that collected information and established pattern in Table 5 and 6 are illustrated in format of tables, they may not necessarily be limited to the format of tables, and other formats including text, figures and so on can also be used to describe the collected information and established pattern. It should also be noted that the pattern in Table 6 can be established using deep learning techniques during handling huge number of data.

At step 703 the test case is generated based on the established pattern. For example, only the pattern whose frequency is higher than a predefined value will be finally determined as a test case. In the example shown in table 6 above, if the predefined value is 5, then only pattern 1 will be selected as the test case to run. It should be noted that there are other ways to determine the test case based on the pattern, for example, if deep learning techniques are adopted, more criteria might be used to make analysis.

It should be noted that the method for testing the online system as illustrated in FIGS. 5 and 6 in accordance with embodiments of this disclosure could be implemented by computer system/server 12 of FIG. 1, and/or the test server as illustrated in FIG. 4 in accordance with embodiments of this disclosure could be implemented as computer system/server 12 of FIG. 1.

Some definitions follow in the following paragraphs.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user or subscriber; and/or (iii) a group of related users or subscribers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for testing an online system, the method comprising:
    obtaining, by one or more computing units, a test rule for testing the online system, with the test rule including information indicative of a first customer environment user identity, and with the test rule including a timestamp;
    retrieving, by one or more computing units, one or more test results from one or more real user actions of the online system based on the test rule;
    generating, by one or more computing units, a test report at least based on the one or more test results retrieved from the one or more real user actions;
    using the test report to diagnose the status of the online system;
    determining, by one or more computing units, whether the timestamp is expired;
    responsive to determining that the timestamp is expired, determining, by one or more computing units, whether number of the one or more test results retrieved from the one or more real user actions is below a threshold;
    responsive to determining the number of the one or more test results retrieved from the one or more real user actions is below the threshold, running, by one or more computing units, a standalone test case associated with the test rule; and
    retrieving, by one or more computing units, a test result from the test case;
    wherein:
    the timestamp is used to indicate an interval of time for the one or more computing units to retrieve the one or more test results from real user actions; and
    the timestamp is used to determine the frequency with which functions associated with the real user actions are accessed, and with the frequency with which functions associated with the real user actions are accessed defining a first function type that is used to further define the interval of time for the one or more computing units to retrieve the one or more test results from the real user actions, and with the first function type that is used to further define the interval of time being frequently accessed by a set of users performing the real user actions.

2. The method of claim 1, wherein the step of generating further comprises:
    generating, by one or more computing units, the test report at least based on the test result retrieved from the test case.

3. The method of claim 1, wherein weights are assigned to the one or more test results retrieved from the one or more real user actions and the test result retrieved from the test case in the step of generating the test report, and the weight of the one or more test results retrieved from the one or more real user actions is higher than the weight of the test result retrieved from the test case.

4. The method of claim 1, wherein:
the threshold is generated automatically based on previous real user actions; and
timestamps applied for different kinds of real user actions are different.

5. The method of claim 1, wherein:
the test rule is data that indicates: (i) identifying information for a customer user environment, and (ii) a set of parameter value(s) related to generating diagnostic data based upon interactions between the customer environment user and the online system;
the online system is a set of computer components connected in data communication such that the set of computer components can provide online services; and
the real user actions are actions made by an end user that is a human being.

6. The method of claim 1 further comprising:
collecting, by one or more computing units, previous real user actions regarding to the online system;
establishing, by one or more computing units, a pattern based on the previous real user actions, wherein the pattern indicating the previous real user actions and a context thereof; and
generating, by one or more computing units, the test case based on the pattern.

7. The method of claim 6, wherein the context includes at least one of the following: sequence of at least two of the previous real user actions, and frequency of at least one of the previous real user actions.

8. The method of claim 1 wherein the step of retrieving further comprises: setting, by one or more computing units, an executor in the online system for obtaining the one or more test results retrieved from the one or more real user actions based on the test rule.

9. A computer system for testing an online system, the system comprising:
one or more processors;
a non-transitory computer-readable storage device coupled to at least one of the processors;
a set of computer program instructions and data stored in the non-transitory computer-readable storage device and executed by at least one of the processors in order to perform the following actions:
obtaining a test rule for testing the online system, with the test rule including information indicative of a first customer environment user identity, and with the test rule including a timestamp,
retrieving one or more test results from one or more real user actions of the online system based on the test rule,
generating a test report at least based on the one or more test results retrieved from the one or more real user actions,
using the test report to diagnose the status of the online system,
determining whether the timestamp is expired,
responsive to determining that the timestamp is expired, determining whether number of the one or more test results retrieved from the one or more real user actions is below a threshold,
responsive to determining the number of the one or more test results retrieved from the one or more real user actions is below the threshold, running a stand-alone test case associated with the test rule, and
retrieving a test result from the test case;
wherein:
the timestamp is used to indicate an interval of time for the one or more computing units to retrieve the one or more test results from real user actions; and
the timestamp is used to determine the frequency with which functions associated with the real user actions are accessed, and with the frequency with which functions associated with the real user actions are accessed defining a first function type that is used to further define the interval of time for the one or more computing units to retrieve the one or more test results from the real user actions, and with the first function type that is used to further define the interval of time being frequently accessed by a set of users performing the real user actions.

10. The computer system of claim 9, wherein the action of generating the test report further comprises:
generating the test report at least based on the test result retrieved from the test case.

11. The computer system of claim 9, wherein weights are assigned to the one or more test results retrieved from the one or more real user actions and the test result retrieved from the test case in the action of generating the test report, and the weight of the one or more test results retrieved from the one or more real user actions is higher than the weight of the test result retrieved from the test case.

12. The computer system of claim 9, wherein the actions further comprises:
collecting previous real user actions regarding to the online system;
establishing a pattern based on the previous real user actions, wherein the pattern indicating the previous real user actions and a context thereof; and
generating the test case based on the pattern.

13. The computer system of claim 12, wherein the context includes at least one of the following: sequence of at least two of the previous real user actions, and frequency of at least one of the previous real user action.

14. A computer program product comprising:
a non-transitory machine readable storage device; and
computer code stored on the non-transitory machine readable storage device, with the computer code including instructions and data for causing a processor(s) set to perform operations including the following:
obtain a test rule for testing the online system with the test rule including information indicative of a first customer environment user identity, and with the test rule including a timestamp,
retrieve one or more test results from one or more real user actions of the online system based on the test rule,
generate a test report at least based on the one or more test results retrieved from the one or more real user actions,
using the test report to diagnose the status of the online system,
determining whether the timestamp is expired,
responsive to determining that the timestamp is expired, determining whether number of the one or more test results retrieved from the one or more real user actions is below a threshold,
responsive to determining the number of the one or more test results retrieved from the one or more real user actions is below the threshold, running a stand-alone test case associated with the test rule, and
retrieving a test result from the test case;

wherein:
the timestamp is used to indicate an interval of time for the one or more computing units to retrieve the one or more test results from real user actions; and
the timestamp is used to determine the frequency with which functions associated with the real user actions are accessed, and with the frequency with which functions associated with the real user actions are accessed defining a first function type that is used to further define the interval of time for the one or more computing units to retrieve the one or more test results from the real user actions, and with the first function type that is used to further define the interval of time being frequently accessed by a set of users performing the real user actions.

15. The computer program product of claim 14, wherein the generating the test report further comprises:
generating the test report at least based on the test result retrieved from the test case.

16. The computer program product of claim 14, wherein weights are assigned to the one or more test results retrieved from the one or more real user actions and the test result retrieved from the test case in the action of generating the test report, and the weight of the one or more test results retrieved from the one or more real user actions is higher than the weight of the test result retrieved from the test case.

17. The computer program product of claim 14, wherein the processor(s) set further causes the computer to perform operations including the following:
collecting previous real user actions regarding to the online system;
establishing a pattern based on the previous real user actions, wherein the pattern indicating the previous real user actions and context thereof; and
generating the test case based on the pattern.

* * * * *